(12) United States Patent
Lee et al.

(10) Patent No.: US 6,821,027 B2
(45) Date of Patent: Nov. 23, 2004

(54) MINIATURIZED PARALLEL OPTICAL TRANSMITTER AND RECEIVER MODULE

(75) Inventors: Hyung Jae Lee, Sunnyvale, CA (US); Yong-Sung Jin, Sunnyvale, CA (US); Yung-Sung Son, Sunnyvale, CA (US)

(73) Assignee: OPTI Japan Corporation, Tokyo (JP)

( * ) Notice: Subject to any disclaimer, the term of this patent is extended or adjusted under 35 U.S.C. 154(b) by 0 days.

(21) Appl. No.: 10/284,629

(22) Filed: Oct. 30, 2002

(65) Prior Publication Data

US 2003/0091301 A1 May 15, 2003

Related U.S. Application Data

(63) Continuation of application No. 09/690,172, filed on Oct. 16, 2000, now abandoned.

(51) Int. Cl.[7] ................................................ G02B 6/43
(52) U.S. Cl. .............................. 385/89; 385/92; 385/94
(58) Field of Search ............................... 385/89–92, 94

(56) References Cited

U.S. PATENT DOCUMENTS

| | | | | |
|---|---|---|---|---|
| 5,088,099 A | * | 2/1992 | Chen et al. .................. 372/45 |
| 5,138,680 A | * | 8/1992 | Briggs et al. .................. 385/90 |
| 5,212,754 A | * | 5/1993 | Basavanhally et al. ........ 385/90 |
| 5,359,618 A | * | 10/1994 | Lebby et al. .................. 372/45 |
| 5,574,814 A | * | 11/1996 | Noddings et al. ............. 385/90 |
| 5,719,978 A | * | 2/1998 | Kakii et al. ................... 385/89 |
| 6,048,107 A | * | 4/2000 | Pubanz ......................... 385/92 |
| 6,250,820 B1 | * | 6/2001 | Melchior et al. ............. 385/89 |

* cited by examiner

Primary Examiner—Ellen E. Kim
(74) Attorney, Agent, or Firm—Squire, Sanders & Dempsey, L.L.P.

(57) ABSTRACT

The present invention relates to a module for parallel transmission and reception of an optical signals, and particularly a miniaturized module with a fixed optical coupler and a detachable electric connector is disclosed. A miniaturized optical signal transmission module according to the present invention comprises an electrical connector for coupling electric signals to a circuit board; an array of optical devices coupled to metal leads, the array of optical devices converting between optical signals and the electric signals; an optical fiber array block fixedly and optically coupled to the array of optical devices for transmitting the optical signals, wherein the metal leads are detachably coupled to the electrical connector part. The optical module can be miniaturized so that the entire system can be miniaturized. Accordingly, many advantages according to the miniaturization of the entire system can be obtained.

5 Claims, 8 Drawing Sheets

MINIATURIZED PARALLEL OPTICAL TRANSMITTER AND RECEIVER MODULE

CROSS-REFERENCE TO RELATED APPLICATIONS

This is a continuation of application Ser. No. 09/690,172, filed Oct. 16, 2000 abandoned.

BACKGROUND

1. Field of the Invention

The present invention relates to a module for transmitting and receiving optical signals through optic fibers, and, more particularly, to a coupling module having a detachable electrical connector for coupling electrical signals to the module.

2. Description of the Prior Art

Increasingly, the technical progress of computer systems requires massive data transmission at high transmission rates to computer peripherals such as monitors, hard discs, printers, and the like. Additionally, the development of the internet accelerates the need for high-speed connections between computer systems so as to lead to a trend of high speed data transmission between separate computer systems.

In responding to this trend, data transmission with existing electrical wires reveals limitations in electrical cabling, including the bandwidth limitations of electrical wires and the effects of electromagnetic wave interference in transmission signals characteristic of high data transmission rates. Accordingly, in order to overcome the limitations of such electric signal transmission, the data transmission field is increasingly looking towards optical signal transmission methods using optical fiber for high rate data transmission.

Optical transmission of data at high transmission rates has several advantages. For example, optical fibers provide higher bandwidth data transmission at lower error rates without the electromagnetic interference inherent in adjacent electrical transmission lines, overcoming two of the primary problems of data transmission over electrical cabling. Complementary optical signal transceiver modules, then, easily cope with the parallel data transmissions that are desirable in many computer system applications.

Conventional parallel optical signal transceiver modules have detachable optical connectors with fixed electrical connections to an external electric circuit. However, the detachable optical connector must have a structure allowing connections and separations. Due to alignment problems inherent in manufacture and in aging of the connector, these connections can become unstable so that the coupling of optical data into or out of the optical fibers is degraded. Such unstable connections may cause the loss or the transformation of transmission data, which is a serious drawback to an optical connector requiring a high reliability of optical data transmission. In addition, the connection part of the detachable optical connector can become polluted with pollutants such as dust and other contaminates, which may also degrade the transmission of optical signals.

One approach to the alignment problem is to more rigidly support the connector part to provide better alignment to the optical fibers. However, this approach increases the size of the connector. As the size of the optical connection part gets larger, the entire system which utilizes the optical connector gets larger as well. The larger size of a system deteriorates space utility efficiency, leading to a reversal in the miniaturization trend, and therefore is an undesirable result. For example, the miniaturization of electrical circuit components built in an electric circuit board lowers the height of the built-in electric circuit components to about 1~2 mm levels from the surface of the electric circuit board, but the height of the conventional optical parallel transceiver module becomes about 1 cm, leading to a difficulty in miniaturizing systems requiring optical connections.

Therefore, there is a need for optical transceiver modules having small form factors that do not suffer the degradation of optical transmission due to alignment or contamination.

SUMMARY OF THE INVENTION

In accordance with the present invention, an optical transceiver system having a detachable electrical connection is presented. Because an electrical connection is detached, rather than the optical connection as is conventional, an optical transceiver system in accordance with the present invention does not suffer from contamination of the optical components or from degradation of the optical alignment due to repeated attaching and detaching operations. Additionally, embodiments of an optical transceiver system in accordance with the present invention can have small form factors in conformity with the about 1 to about 2 mm height of the external circuitry to which the transceiver system is coupled.

In some embodiments, a miniaturized optical transceiver module according to the present invention comprises an electrical connector for coupling an electric signal between an external circuit board and the miniaturized optical transceiver module; an optical device array detachably coupled to the electrical connector so that electrical signals are transmitted between the electrical connector and optical devices in the optical device array; and an optical fiber array block fixedly mounted in the optical device array block so that optical fibers of the optical fiber array are optically coupled to the optical devices of the optical device array. In some embodiments, the electrical connector is fixed on the external circuit board. In some embodiments, an optical device array includes any number of light emitters and optical detectors. In some embodiments, the optical device array includes either light emitters or optical detectors.

These and other embodiments are further described below with respect to the following figures.

In the figures, elements having the same designation between figures have the same function.

DETAILED DESCRIPTION

Figure 1:
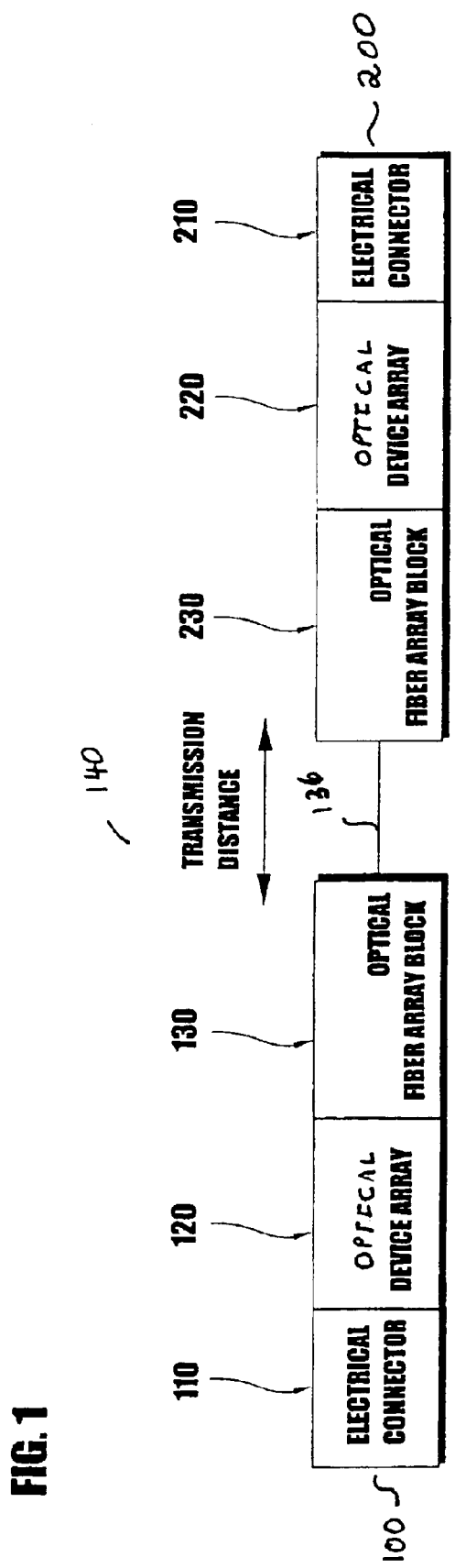
FIG. 1 is a block diagram of a complementary pair of parallel optical transceiver modules according to an embodiment of the present invention.

FIG. 1 shows a block diagram of a parallel optical transceiver system 140 according to an embodiment of the present invention. System 140 includes optical module 100 and optical transceiver module 200, which are coupled by optical fibers 136. Optical module 100 in FIG. 1 includes electrical connector 110, optical device array 120, and optical fiber coupler 130. Optical module 200 includes electrical connector 210, optical device array 220, and optical fiber coupler 230. In some embodiments, optical device array 120 includes an array of light emitters and optical device array 220 includes a corresponding array of optical detectors. In general, optical device array 120 can include any number of individual optical detectors and light emitters. Optical device array 120 is complementary to optical device array 220 in that optical signals transmitted by a light emitter of optical device array 120 is received, through one of optical fibers 136, by a corresponding light detector of optical device array 220. Conversely, an optical signal transmitted by a light emitter of optical device array 220 is received, through one of optical fibers 136, by a corresponding light detector of optical device array 120. The light emitters of optical device array 120 are optically coupled with the optical detectors of optical device array 220 through optical fibers 136. Electrical signals are coupled to the light emitters of optical device array 120 through electrical connector 110. Optical signals are coupled into optical fibers 136 through optical fiber array block 130. Additionally, optical signals are coupled into the optical detectors of optical device array 220 through optical fiber array block 230 and electrical signals are coupled out of optical device array 220 through electrical connector 210.

Optical device arrays 120 and 220 are arranged with optical fiber arrays 130 and 230, respectively, so that optical signals are coupled between the optical devices of optical device arrays 120 and 220 and the optical fibers of optical fiber arrays 130 and 230. In some embodiments, the optical fibers coupled between optical fiber arrays 130 and 230 each have a mirror face processed to be, for example, 45 degree slanted and positioned proximate an upper side of the devices of optical device arrays 120 and 220 in order to couple optical signals between the devices of optical device arrays 120 and 220, respectively, and the optical fibers of optical fiber array blocks 130 and 230, respectively.

Described in detail, in embodiments with a 45 degree slanted mirror face the optical signals are reflected from the 45 degree slanted mirror face placed on the upper side of the light emitting device array and transmitted to optical fibers 136. The optical signals transmitted through the optical fiber array 136 is reflected from a mirror face processed to be 45 degree slanted so as to be transmitted to an arranged light receiving device, thereby achieving the transmission and reception of the optical signals. One advantage of utilizing a 45 degree slant processed optical fiber in optical fiber array blocks 130 and 230 is that wire bonding for connecting optical devices and electrical connections in electrical connectors 110 and 210 are facilitated. Additionally, the arrangement of optical fibers and optical devices is facilitated.

Alternatively, in some embodiments of the invention light is coupled between the optical devices of optical device arrays 120 and 220 and the optical fibers of optical fiber array blocks 130 and 230, respectively, directly. The optical device is arranged adjacent to an optical fiber array on the same layer. Advantageously, the slant-processed faces of optical fiber array blocks 130 and 230 are not necessary, thereby removing one processing step. However, despite that advantage, this structure can be problematic because the efficiency of optical coupling with optical fiber 136 is deteriorated due to the difficulties of coupling signals from optical devices in optical device arrays 120 and 220 to optical fiber 136.

Figure 2:
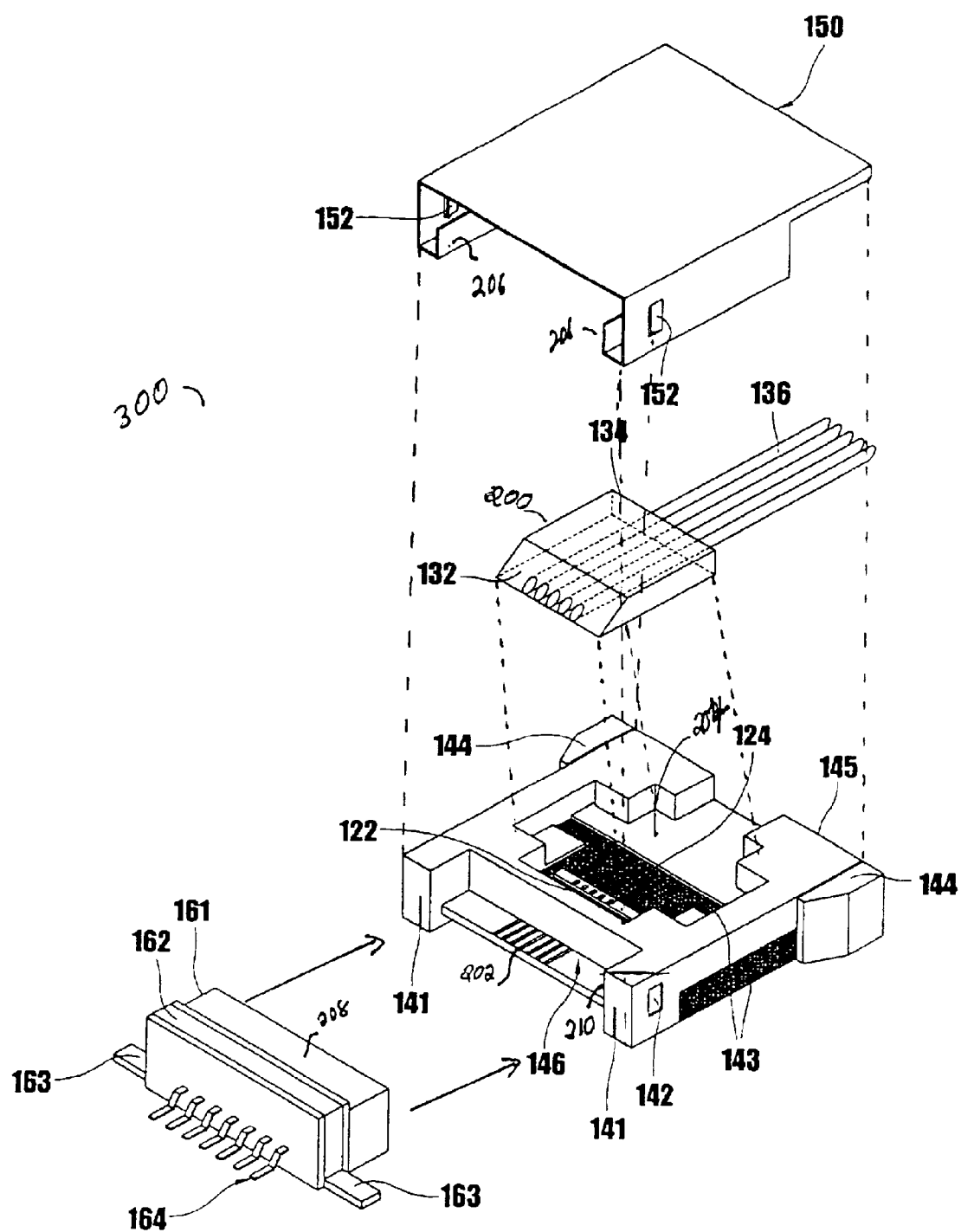
FIG. 2 is an exploding view of an embodiment of an optical transceiver module according to an embodiment of the present invention.

FIG. 2 shows an exploded view of one embodiment of an optical transceiver module 300, which can be either of optical module 100 or optical module 200 (FIG. 1). Optical module 300 includes an optical device array block 145 having an array of optical devices 124, an optical fiber array block 134 having an array of optical fibers 136, and an electrical connector 161. Optical fiber array block 134 is fixedly inserted into optical device array block 145 so that light is coupled between optical devices 124 and optical fibers 136. A cover 150 is attached to optical device array block 145 in order to hold optical fiber array block 134 rigidly in place. Optical fiber array block 145 also includes electrical leads 202 on structural 146 coupled to optical devices 124 so that electrical signals can be transmitted to optical devices 124. Electrical leads 202 are electrically coupled with corresponding leads 164 in electrical connector 161 by slidably attaching optical device array block 145 into electrical connector 161. In some embodiments, small gaps 210 in structure 146 on either side of electrical leads 202 assist in aligning and attaching optical device array block 145 with electrical connector 161. Module 300, therefore, is detachable between electrical connector 161 and optical device array block 145.

Optical devices 124 may be either light emitting devices, optical detectors, or a mixture of light emitting devices and optical detectors. A light emitting device can be any device for converting an electrical signal into an optical signal, such as an edge-emitting laser diode, vertical cavity surface emitting laser diode(VCSEL), light emitting diode(LED), or the like. A VCSEL, in particular, is advantageously utilized as one of optical devices 124 because a VCSEL has a lower electric power consumption due to a low threshold current necessary for a laser oscillation, and a VCSEL emits a circular beam pattern identical to a mode pattern of an optical fiber, and is easily optically coupled to an optical fiber since the radiation angle indicating the extent of divergence according to laser beam propagation is small. Furthermore, a VCSEL is easily characterized; the characteristics of a VCSEL can be directly measured on a manufactured wafer since the VCSEL emits light from the wafer surface. An edge-emitting laser diode, for example, must be cleaved into individual devices after manufacture before the characteristics of light emitted from the chip edge can be tested. Therefore, the VCSEL is a light emitting device that facilitates a lowered cost of mass production. A VCSEL of this type is manufactured by Honeywell or Truelight.

Optical detectors which can be utilized as optical detector devices in optical device array 124 include any device for converting an optical signal into an electrical signal. Optical detectors can be produced from semiconductor materials such as Si, GaAs, and InP, for example. In particular, optical detectors for utilization as optical device 124 can be avalanche photodiodes, pin photodiodes, MSM photodiodes, or other similar devices. A common photodiode is manufactured by Truelight.

In general, the operating speed of an optical detector, such as a photodiode, is dependent on the light-receiving area of the optical detector. As the light-receiving area of a photodiode gets larger, the diode capacitance gets larger and the response time with respect to a changing optical intensity becomes slower. It, then, is necessary to reduce the light-receiving area of a light-receiving device in order for data signals to be transmitted at high data transmission rates. However, as the light-receiving area gets smaller, the amount of light coupled into the optical detector from an optical fiber is reduced. Therefore, the appropriate light-receiving area is determined by balancing the need to couple light into the optical detector with the need for a fast response time.

Optical fibers 136 can be any optical transmission medium. Generally, media employed for optical transmission include single-mode silica fiber, multi-mode silica fiber, and plastic optical fiber. In general, single-mode silica optical fiber has a core diameter of a few micrometers to about 10 $\mu$m through which light is propagated, a clad diameter of about 125 $\mu$m, and an overall diameter of about 250 $\mu$m with a polymer material coated on the outer periphery. Alignment of the single-mode silica optical fiber is critical since the diameter of the core is so small. However, the modal dispersion of a single-mode silica optical fiber is small since the single-mode fiber supports only one optical mode and therefore the single-mode fiber is suitable for long distance transmission, for example up to about a few kilometers.

Two kinds of multi-mode silica optical fibers are widely used and their core diameters are about 50 $\mu$m and about 62.5 $\mu$m, respectively. The clad diameter is about 125 $\mu$m as in the single mode optical fiber and a polymer material is utilized for overall coating so that the entire diameter is about 250 $\mu$m. The multi-mode optical fiber, with its larger diameter core, facilitates optical coupling into the fiber. Therefore, the alignment of a multi-mode fiber is not as critical. However, due to a larger modal dispersion, the transmission distance is typically limited to about a few hundred meters.

Plastic optical fiber using plastic materials such as poly-methyl-methacrylate(PMMA) and the like instead of silica glass can also form optical fibers for optical fiber 136. Plastic fibers can be manufactured with diverse core diameters of from a few tens of micrometers to about 1 mm because of the flexibility of the materials. As the core diameter gets larger less alignment precision is required, which has the advantage of making optical components requiring alignment easier. However, since the number of propagation modes is increased, the transmission distance may be restrained due to the larger light dispersion by a light propagation speed difference between the modes. For example, if the core diameter of a plastic optical fiber is 240 $\mu$m, the transmission distance may be limited due to dispersion to a few tens of meters at a data transmission rate of several hundred Mbps.

In the embodiment shown in FIG. 2, optical fibers 136 are fixedly attached in optical fiber array block 134. Optical fiber array block 134 can be formed with tip ends of optical fibers 136 fixedly arranged with specified intervals within a molded plastic restraint 200. In some embodiments, the tip ends of optical fibers 136 along with molded plastic restraint 200 is polished with, for example, a 45 degree slant-polished mirror face 132 for coupling light between optical device array 124 and optical fibers 136. Optical fiber array block 134 may be manufactured with molded restraint 200 being a transparent material by molding the transparent material, after individual fibers of optical fibers 136 are arranged with specified intervals and heights, over optical fibers 136 and polishing face 132. In some embodiments, optical fibers 136 can be adhered to glass with an optical adhesive and face 132 can be formed directly on the tips of optical fibers 136. In some embodiments, optical fibers 136 can be placed in V-shaped grooves, respectively, formed in an array in certain intervals on a substrate.

In order to obtain large optical coupling between optical fibers 136 and device array 124, optical fibers 136 are formed close to the bottom of optical fiber array block 134. The separation between device array 124 and face 132, therefore, should be as small as possible. Further, a thin-film of evaporated aluminum on face 136 helps form a mirror face to further couple light between optical fibers 136 and optical device array 124.

Optical fiber array block 134 is inserted into slot 204 in module base 145. Slot 204 is arranged to receive optical fiber array 134 and hold optical fiber array 134 rigid so that optical fibers 136 are positioned directly above device array 124. Light from device array 124, then, is reflected into optical fibers 136 by face 132. Conversely, light from optical fibers 136 are reflected into device array 124 by face 132. One skilled in the art will recognize that face 132 can be polished at any angle such that light from optical fibers 136 is reflected onto optical device array 124 and light emitted by optical device array 124 is reflected into optical fibers 136.

Optical device array block 145, in one embodiment, includes a structure 146 on which metal leads 202 are supported. Structure 146 can be a metal lead frame or a flexible printed circuit board. In some embodiments, a metal plate 143 is included on which optical devices 124 are mounted. Metal leads 202 are electrically coupled to optical devices 124 so that electrical signals are coupled between optical devices 124 and metal leads 202.

Optical device array block 145 can be manufactured by injection molding around structure 146. Structure 146 can be, for example, a metal lead frame or a flexible printed circuit board. In some embodiments, structure 146 includes a metal plate 143 on which optical device array 124 is mounted. Driving current or bias voltages can be supplied to light emitters or photodiodes of optical device array 124 through metal leads 202 on structure 146. Additionally, electrical contact with the back side of optical devices in optical device array 124 can be accomplished through metal plate 143. In some embodiments, gold line wiring 122 provides electrical connections between the optical devices of optical device array 124 and individual ones of metal leads 202. Slot 204 in optical device array 145 receives optical fiber array block 134 such that optical fibers 136 are aligned with optical device array 124.

In some embodiments, light from light emitters in device array 124 passes through the bottom side of optical fibers 136 on which, for example, a 45 degree slanted mirror face 132 is formed. The light is then reflected from mirror face 132 and propagates through optical fibers 136. Additionally, light propagated through optical fibers 136 is reflected from mirror face 132 at the tip ends of optical fibers 136, passes through the bottom side of optical fibers 136, and is incident on a light-receiving face of a photo detector of optical device array 124. The height of optical fiber array block 134 is larger than the diameter of individual fibers of optical fibers 136, but can be manufactured to be about 0.5 to about 1 mm for miniaturization of the entire optical transceiver module 300.

Grooves 141 and 142 are provided on both sides of optical device array block 145 to accommodate a metal cover 150. Metal cover 150 includes matching protrusions 206 and 152, respectively, so that metal cover 150 can be attachably fixed to optical device array block 145 after optical fiber block 134 is inserted into groove 204. In some embodiments, handles 144 can be provided on the sides of optical device array block 145 to facilitate attaching and detaching electrical connectors 161 with optical device module 145. In some embodiments, the resulting height of module base 145 is manufactured to be about 1 to about 2 mm for miniaturization.

Metal cover 150 can be manufactured by folding a metal plate, which in some embodiments has a thickness of about 200 μm. Metal cover 150 is inserted into module base 145 so that protrusions 206 slide into grooves 141. Latch plates 152 formed on cover 150 is latched into grooves 142 formed on both sides of the module base 145 in order to securely fix cover 150 to module base 145.

Metal cover 150 has multiple purposes, including protection of the interior of optical device module 145 from dust and other contaminants. Metal cover 150 can also provide a heat-sink function when thermally contacted by heat-radiating metal plates 143 on both sides of module base 145. Metal cover 150 can also prevent malfunctions of the module of the present invention by electromagnetic shielding of optical devices in optical device module 145.

Module 145 is further arranged to mate with electrical connector 161. Electrical connector 161 includes a housing 208 that slidably attaches with insert 210 of module 145 so that metal leads 202 are electrically coupled to metal leads 164. In some embodiments, a metal band 162 and solder portions 163 allow electrical connection part 161 to be mounted to a circuit board. In some connections, metal leads 164 may be coupled into an electrical cable.

Figure 3:
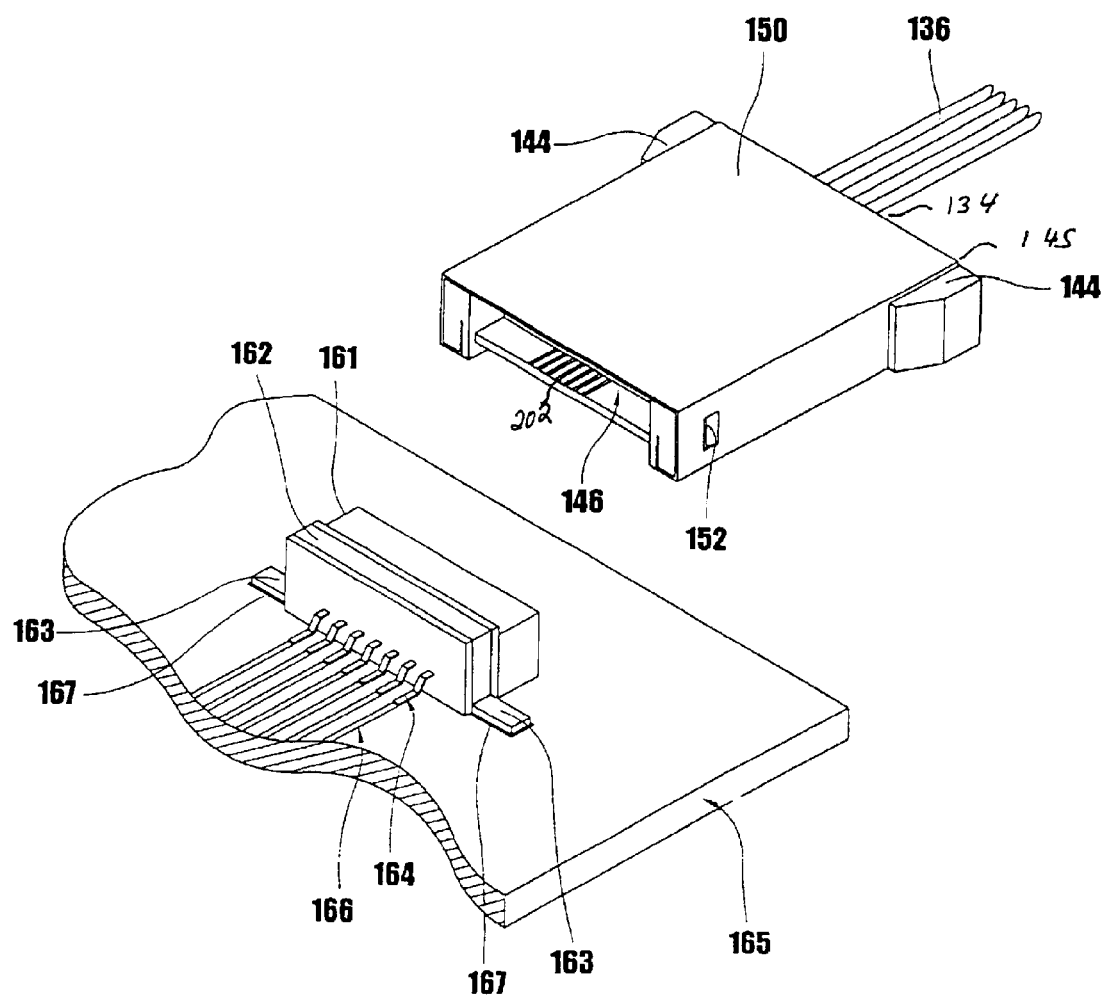
FIG. 3 shows an assembled view of the embodiment of the transceiver module shown in FIG. 2.

FIG. 3 shows electric connector part 161 attached on a printed circuit board 165. Metal leads 164 can be soldered on a wiring pattern 166 on printed circuit board 165, and left and right soldering portions 163 of a metal holder 162 can be fixedly soldered on fixture patterns or contacts 167 on printed circuit board 165. In some embodiments, connector part 161 can be epoxied or otherwise attached to circuit board 165. FIG. 3 further shows the assembled combination of metal cover 150, optical fiber block 134, and device module 145.

Figure 4:
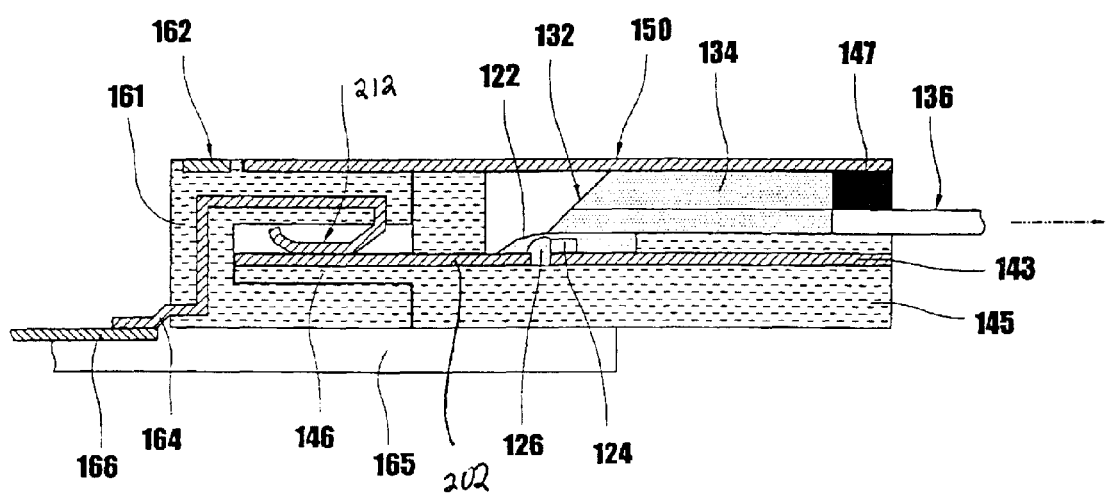
FIG. 4 shows a cross-sectional view of the embodiment of the transceiver module shown in FIG. 2.

FIG. 4 is a cross-sectioned view of electric connector 161 engaged with optical module 145. FIG. 4 shows one of metal leads 164 of electrical connector 161.

Each metal lead of metal leads 164 has a spring portion 212 to contact with one of metal leads 202 from device module 145. Structure 146 of module 145, with one of metal leads 202, is pressed under spring portion 212, thereby making an electrical contact between metal leads 202 of device module 145 and metal leads 164 of electrical connector 161 and holding module 145 in place relative to electrical portion 161. Metal leads 164 can be soldered to pattern 166 on circuit board 165. Gold wire 122 makes electrical contact between one of optical device array 124 and one of metal leads 202. In some embodiments, metal leads 202 are held in place by epoxy 126.

Further, one of optical device array 124 is arranged relative to one of optical fibers 136 in optical fiber array block 134. In some embodiments, optical fiber block 134 includes a 45 degree slanted mirror face 132. The space between optical fibers 136 and optical device array 124 and an area of the gold line wiring 122 can be filled with a transparent optical adhesive 126 to be firmly engaged. Adhesive 126 in the area of gold line wiring 122 and the optical connection area between the one of optical fibers 136 and the corresponding one of optical device array 124 may protect these components from the external environment.

In some embodiments, optical adhesive 126 can have nearly the same refractive index as optical fibers 136. By using the optical adhesive having nearly the same refractive index as the optical fiber, a reflection loss on the bottom side of optical fibers 136 may be reduced when compared to embodiments where the space between optical fibers 136 and optical device array 124 contains air having the refractive index of 1.

In some embodiments, portions of optical fibers 136 outwardly extended from device module 145 are molded with a stress buffering part 147, which can be a flexible material such as silicone rubber and the like. Stress buffering part 147 is formed in order to prevent bending of optical fibers 136 in case an external force is exerted on optical fibers 136.

Figure 5:
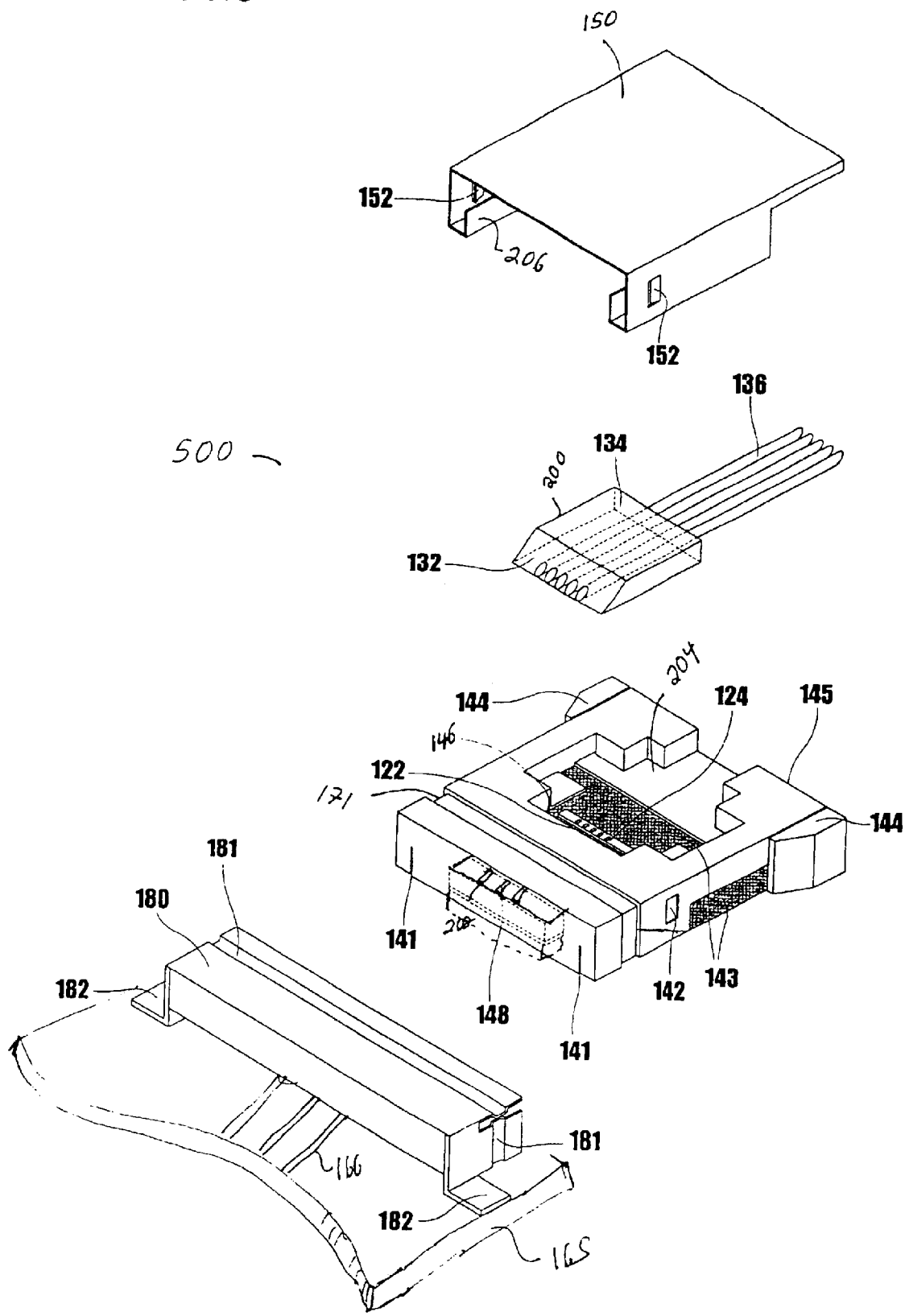
FIG. 5 is an exploding view of another embodiment of an optical transceiver module according to the present invention.

FIG. 5 shows an exploded view of another embodiment of an optical module according to the present invention. Optical module 500, which can be either of optical module 100 or optical module 200 (FIG. 1), differs from optical module 300 shown in FIG. 5 in the electrical connector.

Optical fiber block 134 of FIG. 5 includes optical fiber array 136 spaced and fixed in block 200. Block 200 and optical fiber array 136 have polished surface 132, which in some embodiments is a 45° angled and mirrored surface. Optical fiber block 134 is inserted into groove 204 of optical device module 145 so that optical fibers of optical fiber array 136 are fixedly positioned relative to individual optical devices of device array 124. Device array 124 can be mounted on metal plate 143. Electrical connections to metal leads 202 in optical device module 145 can be formed with gold wires 122. Cover 150, having ridges 206 and 152, can be positioned with grooves 141 and 142 on module 145 to hold optical device module 134 in place and provide protection for optical device module 134, as has been previously described. Metal cover 150 can be positioned around module 145 so that groove 171 is protruding.

In FIG. 5, optical device array 124 is electrically coupled to an elastomeric connector 148. Elastomeric connector 148 has a structure formed with silicon rubber and a stacked conductor. If a conductor is pressed on both sides of elastomeric connector 148, electrical contact is made between the conductors. Such elastomeric connectors are already commercialized and widely used for electrical connections to liquid crystal displays and the like, for example the elastomeric connector produced by Fujipoly Corp.

The stacked interval of the silicon rubber and the conductor in elastomeric connector 148 is formed with a pitch of around 100 μm, so that elastomeric connector 148 can be used in electrically connecting plural electrical contacts simultaneously. An upper side of the elastomeric connector 148 of FIG. 5 is electrically contacted with structure 146 having metal leads 202 coupled to device array 124. The lower side of elastomeric connector 148 is slightly protruded from the bottom side of module base 145 so as to be contacted with the electrical contacts arranged on a printed circuit board 165.

A module holder 180 can be manufactured by folding a metal plate of, for example, a 200 μm thickness. Module holder 180 can be soldered on a printed circuit board 165 in which the optical signal transmission module or the optical signal reception module is mounted in order for the transmission and reception modules to be easily detachable and to be arranged with contacts 166 on printed circuit board 165. A latch groove 171 is provided on the upper and side surfaces of module base 145 of optical signal transmission module 500 so as to carry out a latch operation when engaged with the module holder 180.

In some embodiments, a finger stop 181 can be press-manufactured in a convex shape in module holder 180 to operate with latch groove 171 and fix module 145 in place with module holder 180. A module insertion part of the holder 180 secures an electrical contact through a close contact with elastomeric connector 148 by a spring action.

Figure 6:
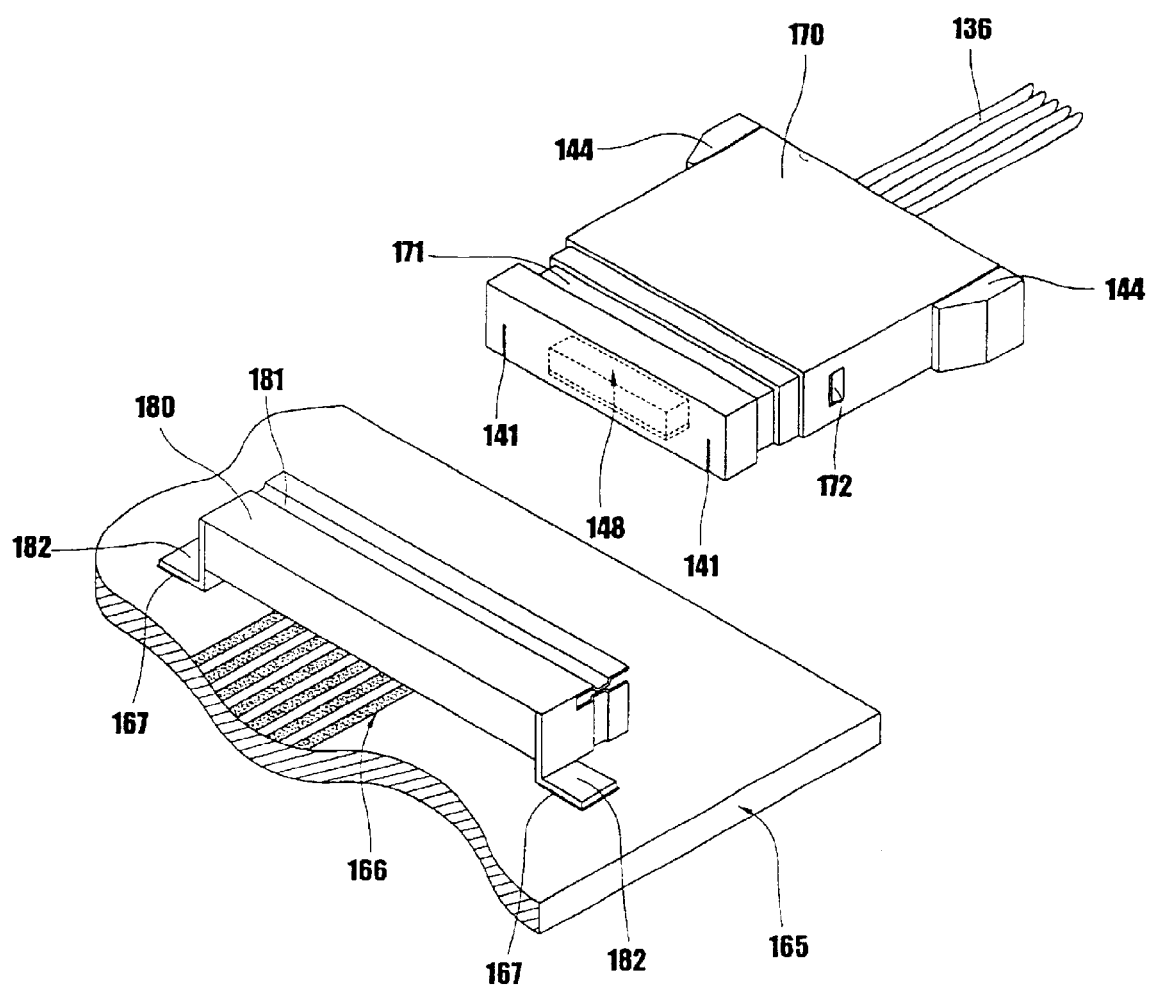
FIG. 6 shows an assembled view of the embodiment of the optical transceiver shown in FIG. 5.

FIG. 6 shows module 145 assembled with cover 150 and optical fiber module 134 and module holder 180 mounted on circuit board 165 for receiving module 145. Module holder 180 can be provided with soldering parts 182 on both sides to be fixed on printed circuit board 165. Soldering parts 182 are positioned to align metal leads 166 with metal leads 202 of module 145 through elastomeric connector 148 when module 145 is coupled with module holder 180.

Figure 7:
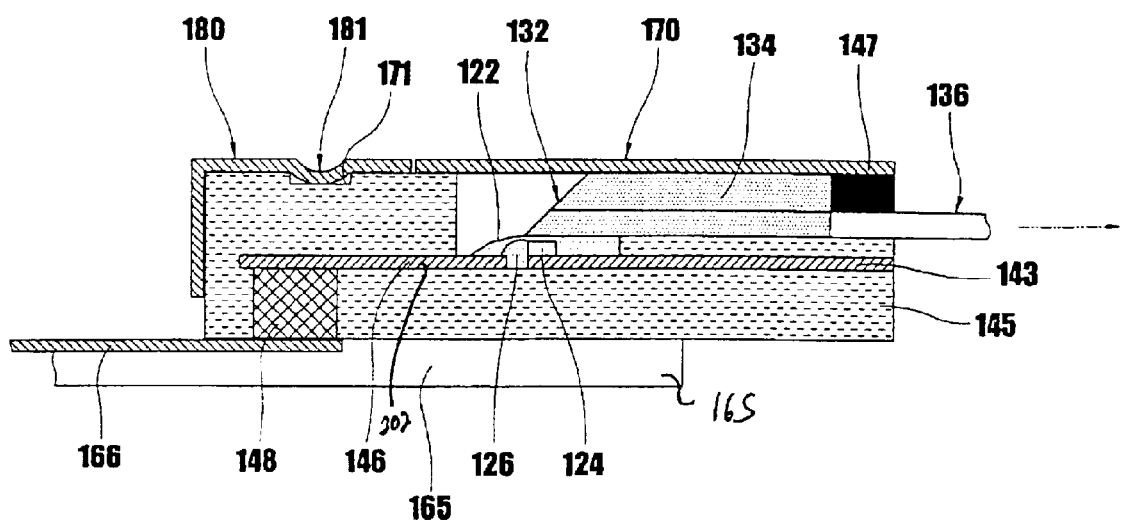
FIG. 7 is a cross-sectional view of the optical signal transmission/receiver part of FIG. 5.

FIG. 7 illustrates a cross sectional view of module 145 when engaged with module holder 180. As has been discussed before, metal leads 202 is coupled to an optical device of optical device array 124 with gold wire 122. The space between the optical device and the corresponding one of optical fibers 136 can be filled with transparent adhesive 124. Metal leads 202, supported by structure 146, makes electrical contact with elastomeric connector 148. Elastomeric connector 148 is held in place over metal lead 166 on circuit board 165 by module holder 180 so that an electrical coupling is created between one of metal leads 202 and the corresponding one of metal leads 166.

Figure 8:
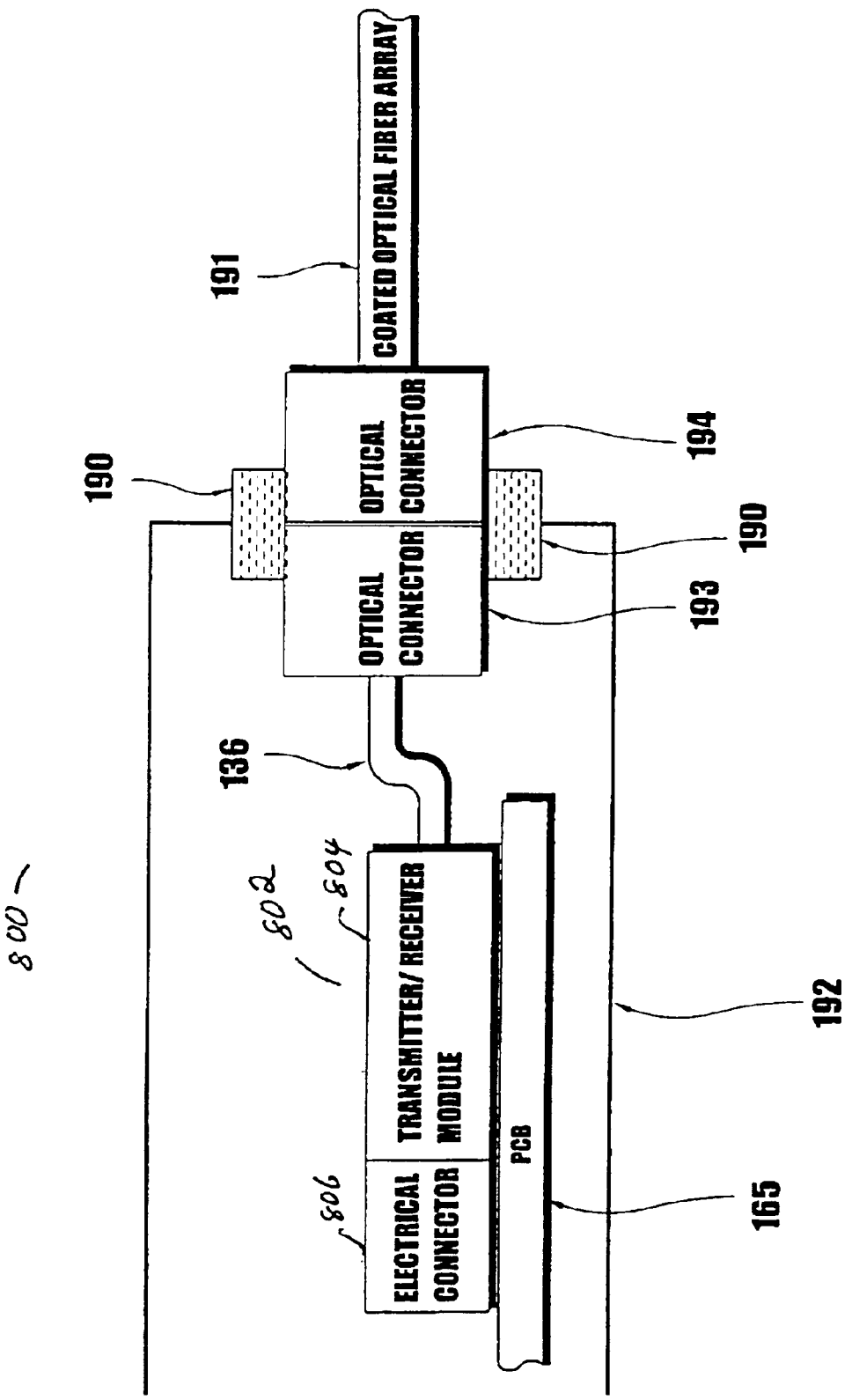
FIG. 8 is a block diagram of another embodiment of an optical transceiver module according to the present invention.

FIG. 8 shows a modified arrangement of a parallel optical signal transceiver module 800 according to an embodiment of the present invention for a long distance transmission. Optical transceiver module 802 can be, for example, optical transceiver module 300 of FIG. 2 or optical transceiver module 500 of FIG. 5, or any other optical transceiver module according to the present invention. As described above, optical transceiver module 802 includes an optical device module 804 detachable from an electrical connector 806.

Optical fibers 136 are generally bare, i.e., without an outer jacket, to facilitate miniaturization of the parallel optical device module 802. However, when the parallel optical signal transceiver module is applied for a considerably long distance transmission and bare optical fibers are used, the bare optical fibers have a deteriorated mechanical strength so as to be weakened with respect to the outer environment. FIG. 8 shows an embodiment for improving this structure.

Optical transceiver module 802, according to some embodiments of the present invention, are mounted on an interior printed circuit board 165 as described above for modules 300 (FIG. 2) and 500 (FIG. 5). Optical fiber array 136 connected thereto is bare without any jacket. A tip end of optical fiber array 136 is provided with an inner optical connector 193. Further, inner optical connector 193 can be mounted on a housing 192 and coupled to an outer optical connector 194. Base optical fibers of optical fiber array 136 are then coupled to jacketed optical fibers of jacketed optical fiber array 191. Jacketed optical fiber array 191 provides for mechanical protection of optical fibers as well as environmental protection for optical fibers and is therefore suited for long-distance transmission of optical systems.

Some embodiments of optical transceiver modules according to the present invention include VCSEL light emitting devices in order to reduce power consumption and increase efficiency in coupling optical signals to optical fibers. A 45 degree slant-processed optical fiber array block can be utilized in coupling signals to optical fibers. A metal plate can be utilized in the case to rigidly position optical fibers relative to optical devices, protect components from external electromagnetic fields as well as environmental pollutants, and to provide a heat-sink. In some embodiments, the optical transceivers module can be miniaturized to have a height of about 1 to about 2 mm.

In addition, electrical connection parts of the modules can be formed in a detachable connector structure so that optical connection parts remain fixed, to thereby prevent a performance deterioration due to polluted optical connection parts. Further, some embodiments of the invention include a second optical coupler to a jacketed optical fiber array for long distance signal transmission and reception between systems.

The above disclosure provides examples of embodiments of the invention only and is not intended to be limiting. One skilled in the art will recognize variations which are intended to be within the scope of this invention. For example, other methods of coupling light to optical devices, e.g., with collimator, may be utilized. As such, the invention is limited only by the following claims.

What is claimed is:

1. An optical transmission module, comprising:

an electrical connector for coupling electric signals to the optical transmission module, wherein the electrical connector includes a slot-type connector, and wherein the electrical connector has a deflectable flange with finger stop;

an optical device module detachably connectable to the electrical connector part and capable of making electrical connection with the electrical connector part so that the electrical signals are coupled to an array of optical devices mounted within the optical device module;

wherein the optical device module includes an elastomeric connector and a pair of trapezoidal handles outwardly extending from the optical device;

wherein an optical fiber array block having an array of optical fibers is fixedly mounted in a groove within the optical device module so that each optical fiber of the array of optical fibers is coupled to one optical device of the optical device module;

wherein the array of optical devices includes light emission devices comprising at least one of vertical cavity surface emitting laser diodes, edge-emitting laser diodes, and photodiodes;

wherein the optical fiber array and the optical fiber array block have a slant-processed face, the face of the optical fiber array being placed on the optical array to optically couple light between the optical device array and the optical fiber array, and wherein the slant-processed face of the optical fiber array block is a 45-degree mirrored surface;

wherein an optical adhesive is filled and cured on a portion at which a conductive wire extending from a metal lead coupleable to the electrical connector and the light emitting device array are bonded, and on a portion at which the light emitting device array and the optical fiber array are coupled;

a metal plate on which the array of optical devices is mounted;

a module cover for covering the optical device module, wherein the light emitting device array is fixedly and optically coupled with the optical fiber array block;

an optical connector optically coupling the array of optical fibers to a second array of optical fibers; and a heat diffusing element located on an exterior of the optical device module and in thermal communication with the metal plate to permit transfer of heat from the optical device module to the heat defusing element via the metal plate.

2. An optical module, comprising:

an optical fiber array block for transmitting an optical signal;

an optical device fixedly and optically connected with the optical fiber array block and for converting between an optical signal transmitted by the optical fiber array block and an electrical signal;

an electrical connector detachable coupled to the optical device, and for coupling the electrical signal a circuit board;

wherein the optical fiber array block has a 45 degree slant-processed face, the face of the optical fiber array block being placed on a light-receiving array of the optical device to optically couple the light-receiving array of the optical device and the optical fiber array block;

wherein an optical adhesive is filled and cured on a portion at which conductive wire extended from metal leads to the optical device are bonded, and on a portion at which the light-receiving array of the optical device and the optical fiber array are coupled;

a metal plate in which the light-receiving array of the optical device is built;

a module base having a built-in groove in which the optical fiber array block is built;

a module cover for covering the module base, wherein the light-receiving device array is fixedly and optically connected with the optical fiber array block; and a heat diffusing element located on an exterior of the module base and in thermal communication with metal plate to permit transfer of heat from the optical fiber array block to the heat diffusing element via the metal plate.

3. The optical signal reception module as claimed in claim 2, wherein an optical connector is additionally provided at an outer end of the optical fiber array block, so that an optical fiber array inside the block is optically connected to an optical fiber array outside the block.

4. The optical signal reception module as claimed in claim 2, wherein the optical device is coupled to an elastromeric connector.

5. The optical signal reception module as claimed in claim 2, wherein the electrical connector part includes a slot-type connector.

* * * * *